United States Patent
Creager

[11] Patent Number: 6,142,032
[45] Date of Patent: Nov. 7, 2000

[54] ADJUSTABLE ANTI-BACKLASH NUT ASSEMBLY

[76] Inventor: Wesley Carl Creager, 376 Avenida Abetos, San Jose, Calif. 95123

[21] Appl. No.: 09/014,998
[22] Filed: Jan. 30, 1998
[51] Int. Cl.[7] .................................................. F16H 55/18
[52] U.S. Cl. ........................... 74/441; 74/459; 74/89.15; 74/424.8 R
[58] Field of Search ........................... 74/89.15, 424.8 R, 74/409, 440, 441, 459

[56] References Cited

U.S. PATENT DOCUMENTS

| | | | |
|---|---|---|---|
| 2,623,403 | 12/1952 | Terdina | 74/424.8 |
| 2,708,729 | 5/1955 | Shull | 317/249 |
| 3,124,969 | 3/1964 | Grabowski et al. | 74/441 |
| 4,131,031 | 12/1978 | Erikson et al. | 74/441 |
| 4,872,795 | 10/1989 | Davis | 411/433 |
| 5,467,661 | 11/1995 | Lange | 74/411 |

*Primary Examiner*—Thomas R. Hannon
*Assistant Examiner*—David Fenstermacher

[57] ABSTRACT

An anti-backlash nut assembly for translational movement along the axis of a leadscrew in response to rotational movement of the nut assembly relative to the leadscrew. The nut assembly comprises (i) a primary nut having an internal thread which mates with an external thread on the leadscrew; (ii) a secondary nut having an internal thread which mates with the external thread on the leadscrew, the secondary nut being capable of rotational movement about the leadscrew independent of the primary nut; (iii) a spring disposed intermediate the primary nut and the secondary nut; and (iv) a housing connected to the said primary nut which surrounds the spring and the secondary nut, for imparting rotational movement applied thereto simultaneously to the primary nut and the secondary nut. In a second embodiment, the nut assembly comprises (i) a primary nut having an internal thread which mates with an external thread on the leadscrew; (ii) a preload member having an internal thread which mates with the external thread on the leadscrew, the secondary nut being capable of rotational movement about the leadscrew independent of the primary nut; (iii) a spring disposed intermediate the preload member and an adjustment member; and (iv) an adjustment member connected to the housing and having a bore for insertion of the leadscrew therethrough; and (v) a housing connected to the primary nut which surrounds the spring, the preload member and the adjustment member, for imparting rotational movement applied thereto simultaneously to the primary nut and the preload member. The adjustment member capable of rotating about the leadscrew for adjusting the preload of the spring while the nut assembly is mounted on the leadscrew.

15 Claims, 3 Drawing Sheets

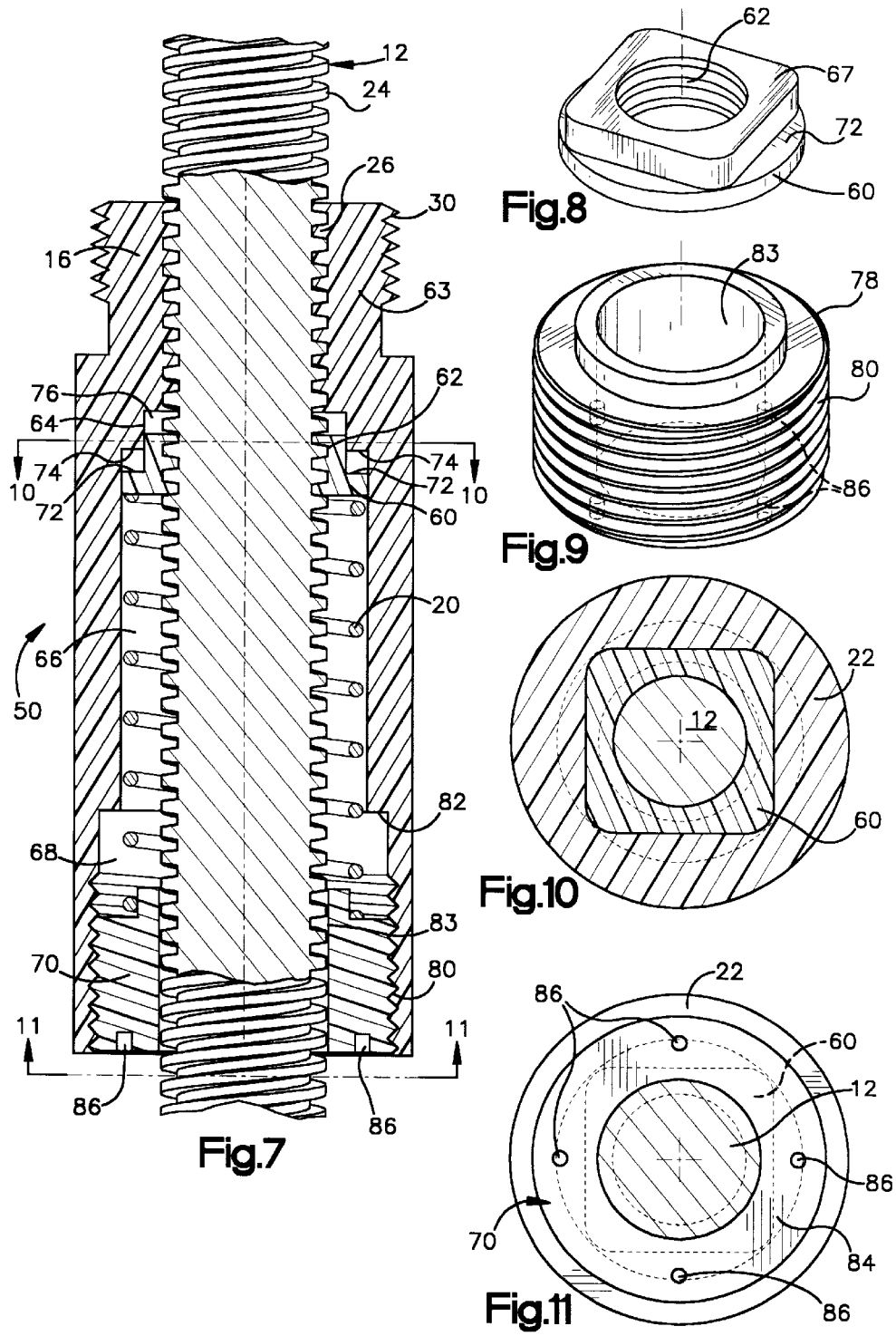

ADJUSTABLE ANTI-BACKLASH NUT ASSEMBLY

FIELD OF THE INVENTION

The present invention relates generally to motion control devices and more particularly to anti-backlash nut assemblies designed for translational movement along a threaded leadscrew in response to rotational movement of the nut relative to the leadscrew.

BACKGROUND OF THE INVENTION

In a variety of mechanical applications it is often required that one element of a machine be moved longitudinally with respect to another element of the machine along a threaded leadscrew with repeatable accuracy. One example of such an application is a print head which must be moved with respect to a platen on a data printer on repetitive occasions with precision.

One manner of providing such a motion control device is to attach a moveable machine element to a nut on the leadscrew. When the leadscrew is rotated, its rotational movement is translated to longitudinal movement of the nut and the attached moveable element along the longitudinal axis of the leadscrew. The position of the nut may be adjusted along the longitudinal axis of the leadscrew to determine the range of longitudinal movement of the element attached thereto.

Providing a nut which is adjustable with respect to the leadscrew, however, introduces the problem of backlash. Backlash is the play or slop which results from loose connections between mechanical elements, such as nuts and leadscrews. Because backlash introduces longitudinal positioning errors, elimination of backlash in precision motion control devices is desirable.

Mechanisms for reducing backlash in nut and leadscrew assemblies are known. One manner of reducing backlash is to separate a nut on a leadscrew into two parts and install a compressed spring between the two parts of the nut. The compressed spring applies a biasing force, which is exerted in opposite longitudinal directions along the axis of the leadscrew, to the surfaces of both parts of the nut to which it is coupled. The biasing force urges the internal threads on both portions of the nut into contact with external threads on the leadscrew to thereby reduce backlash. Many prior art anti-backlash nut assemblies disclose two-piece nut portions which are separated by a spring to force the internal threads on at least one of the two pieces of the nut into contact with external threads on the leadscrew to reduce backlash.

One disadvantage of prior art anti-backlash nut assemblies is they generally do not have means for adjusting the compressive force or preload provided by the spring intermediate the two portions of the nut, and especially when the nut assembly is installed on the leadscrew. The compressive force provided by the spring must be adjustable to accommodate light or heavy tension applications. Moreover, adjustability of the compressive force of the spring without removing the nut assembly from the leadscrew is important if it is desired to maintain the exact position of the nut assembly on the leadscrew for continued operation.

Another disadvantage of prior art anti-backlash nut assemblies is that they generally have an externally mounted spring which results in a shortened life of the assembly due to exposure of the spring and the retaining mechanism to dirt or corrosive contaminants, as well as contributing to a loss of spring lubricant. In addition, due to the external mounting of the spring, a mounting flange or other means must be utilized to mount any external assemblies such as a print head of a printer. Also, the external spring mount design requires a larger overall size of the nut assembly. Further, the exposed spring may be a "pinch point" or safety issue. Still further yet, prior art external spring mount designs do not capture broken pieces should the spring fail, which could result in serious damage to external machinery. Last, prior art external spring mount designs may result in a change of preload during load reversals.

Accordingly, it is highly desired to provide an improved anti-backlash nut and spring assembly having adjustment means to adjust the spring preload while the assembly is installed on a leadscrew while preventing a change in the amount of preload during load reversals. It is also desired to provide such a nut and spring assembly wherein the spring is internally mounted within a housing to avoid exposure to contaminants, retain necessary lubricants, and provide an added safety feature whereby extraneous matter may be caught in the spring. It is also desired to provide an anti-backlash nut assembly with a reduced number of parts wherein additional mounting flanges or other mounting parts are not needed. Still further yet, it is desired to provide a design which captures broken pieces should the spring fail, and thus preventing serious damage to external machinery.

SUMMARY OF THE INVENTION

The invention provides in one aspect an anti-backlash nut assembly designed for translational movement along the axis of a leadscrew in response to rotational movement of the nut assembly relative to the leadscrew. The anti-backlash nut assembly comprises a housing comprising a primary nut therein, the primary nut having an internal thread which mates with an external thread on the leadscrew. A secondary nut is disposed within the housing and has an internal thread which mates with the external thread on the leadscrew. The primary nut is capable of rotational movement about the leadscrew independent of the secondary nut. A spring is contained within the housing and is disposed between the primary nut and the secondary nut. The housing imparts rotational movement applied thereto simultaneously to the primary nut and the secondary nut.

The invention provides in another aspect an adjustable anti-backlash nut and leadscrew assembly, comprising a housing connected to a primary nut with an internal thread that mates with an external thread on the leadscrew. A preload member is disposed within the housing and has an internal thread which mates with the external thread on the leadscrew. The primary nut is capable of rotational movement about the leadscrew independent of the preload member. An adjustment member is connected to the housing and has a hole for insertion of the leadscrew therethrough such that the adjustment member may be rotated over the leadscrew during operation for adjusting the spring preload. The spring is contained within the housing and is disposed between the preload member and the adjustment member for urging the primary nut and preload member together. The housing imparts rotational movement applied thereto simultaneously to the primary nut and the preload member.

The invention provides in yet another aspect an anti-backlash nut assembly designed for translational movement along the axis of a leadscrew in response to rotational movement of the nut assembly relative to the leadscrew, the assembly comprising a housing having a primary nut contained therein, the primary nut having an internal thread which mates with an external thread on the leadscrew. A secondary nut is also disposed within the housing, and has an internal thread which mates with the external thread on the leadscrew. The primary nut is capable of rotational movement about the leadscrew independent of the secondary nut. A spring is contained within the housing for preventing backlash of the primary and secondary nut upon the leadscrew and the housing imparting rotational movement applied thereto simultaneously to the primary nut and the secondary nut.

BRIEF DESCRIPTION OF THE DRAWINGS

FIG. 7 is a cross-sectional side view of the leadscrew and anti-backlash nut assembly as shown in FIG. 6;

FIG. 8 is a perspective view of the preload nut of the leadscrew and anti-backlash nut assembly as shown in FIG. 6;

FIG. 9 is a perspective view of the adjustment member of the leadscrew and anti-backlash nut assembly as shown in FIG. 6;

FIG. 10 is a cut-away view of the leadscrew and anti-backlash nut assembly as shown in FIG. 7 in the direction 10—10; and FIG. 11 is an end view of the leadscrew and anti-backlash nut assembly as shown in FIG. 7.

DETAILED DESCRIPTION OF THE PREFERRED EMBODIMENT

Figure 1:
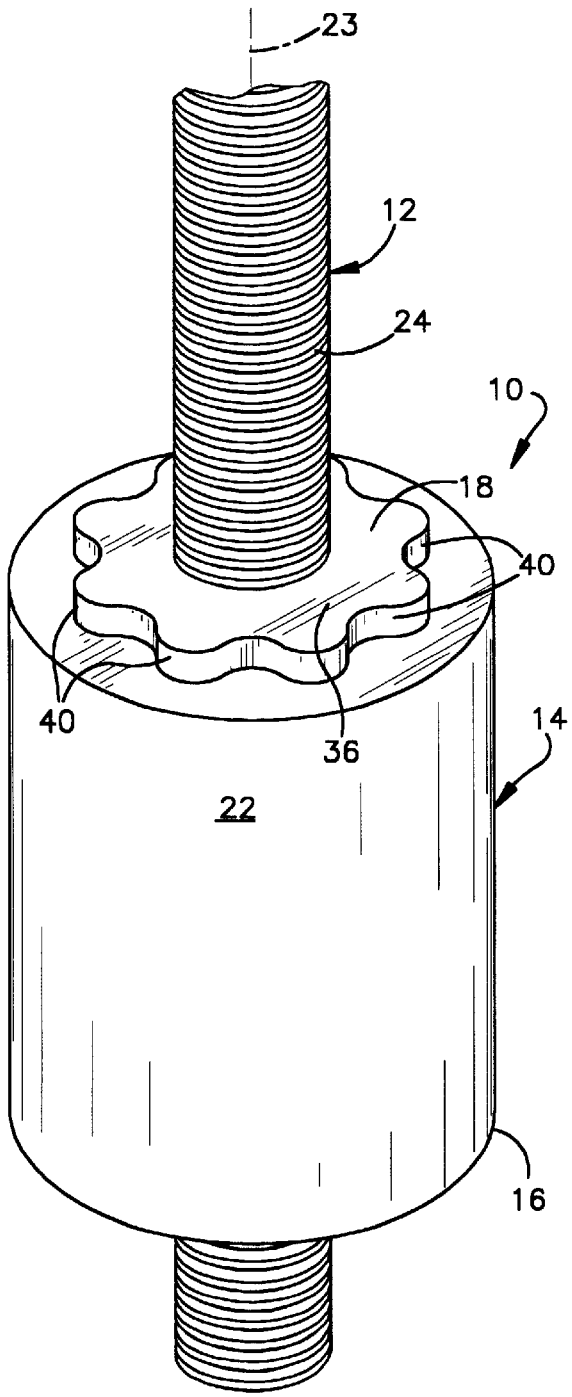
FIG. 1 is a perspective view of a leadscrew and anti-backlash nut assembly constructed according to the principles of the present invention.
Figure 6:
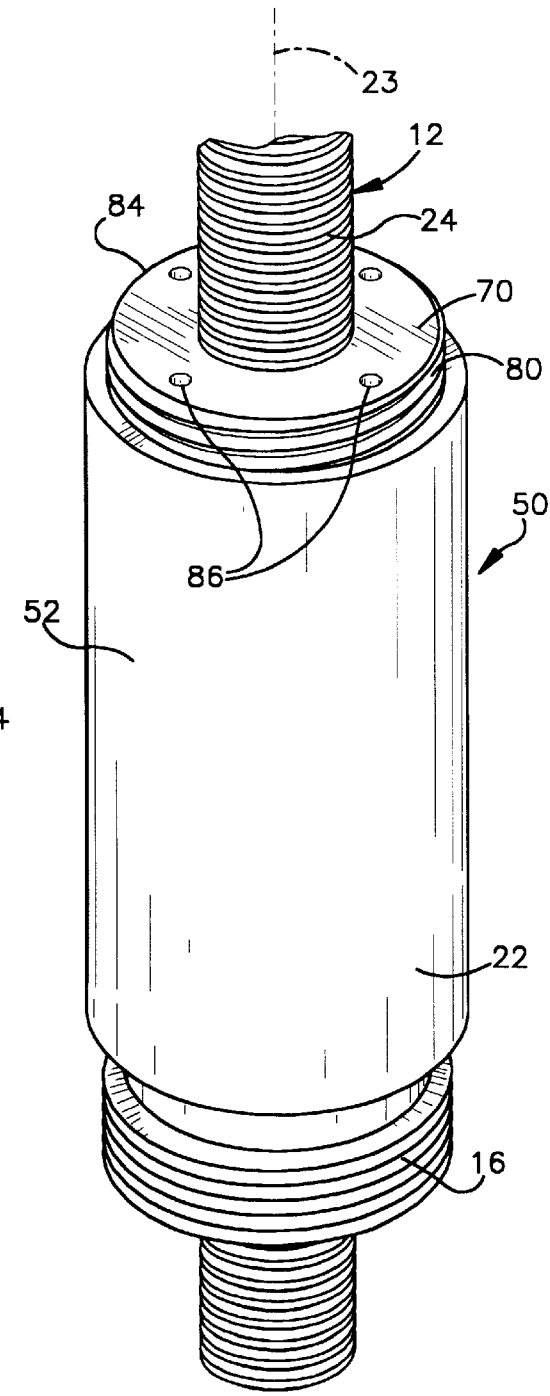
FIG. 6 is a perspective view of another leadscrew and anti-backlash nut assembly constructed according to the principles of the present invention.
Figure 2:
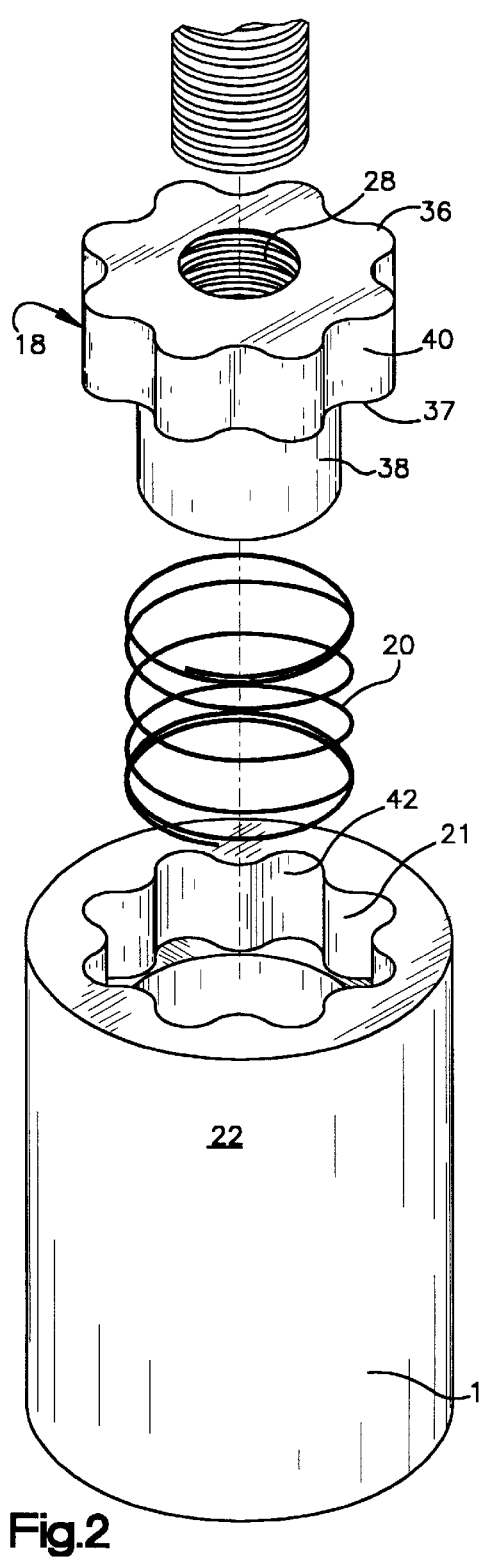
FIG. 2 is an exploded perspective view of the leadscrew and anti-backlash nut assembly as shown in FIG. 1.

A first embodiment of a leadscrew and anti-backlash nut assembly 10 constructed according to the principles of the present invention is shown in FIGS. 1 through 5. The anti-backlash nut assembly 10 comprises a nut and spring arrangement 14 for operation on a leadscrew 12. The nut and spring arrangement 14 comprises a primary nut 16 a secondary nut 18, and a spring 20 disposed intermediate the primary 16 and secondary 18 nuts. The primary nut 16 comprises an integral load bearing housing 22 which surrounds the secondary nut 18 and the spring 20. The exterior surface of the integral housing 22 may comprise any desirable shape such as a square, rectangle or any other suitable shape for mounting any custom designed application. Alternatively, an optional flange or machine element may be mounted on an external thread 30 located on the exterior surface of the primary nut 16 to provide an additional mounting surface for a machine element which is desired to be moved longitudinally along the axis 23 of the leadscrew 12 (not shown).

The leadscrew 12 is preferably comprised of steel, bronze or a thermoplastic and is machined by conventional methods to provide an external thread 24 which runs substantially along its entire length. The primary nut 16 and the secondary nut 18 may also be comprised of any suitable material such as aluminum, plastic, steel, or bronze. It is preferred that the plastic have good machinability and lubrosity characteristics such as acetyl plastic and acetron.

Both the primary nut 16 and the secondary nut 18 are provided with holes having internal threads 26 and 28, respectively, which corresponds to the external thread 24 on the leadscrew. Rotational movement of the leadscrew 12 is translated into longitudinal movement of the nut and spring assembly 14 along a longitudinal axis 23 of the leadscrew 12.

Figure 3:
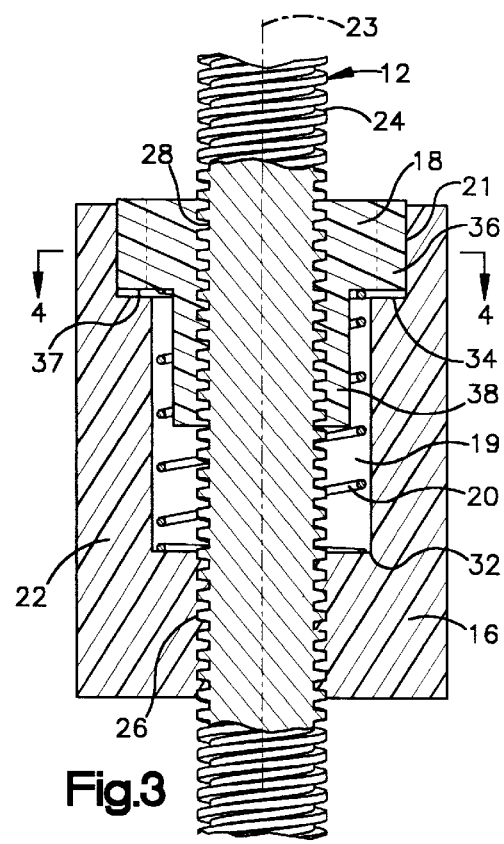
FIG. 3 is a cross-sectional side view of the leadscrew and anti-backlash nut assembly as shown in FIG. 1.
Figure 4:
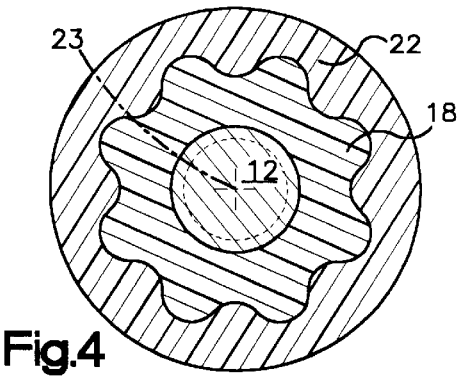
FIG. 4 is a cross-sectional view of the lead screw and nut assembly as shown in FIG. 3 in the direction 4—4.
Figure 5:
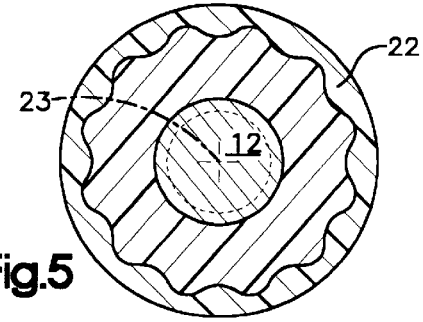
FIG. 5 is a cross-sectional view of the lead screw and nut assembly shown with an alternative embodiment of the secondary nut as shown in FIG. 3 in the direction 4—4.

As shown in FIG. 3, the interior of the integral housing 22 comprises a first threaded portion comprising the primary nut 16, a second portion 19 for receiving a spring 20, and a third portion 21 for receiving the secondary nut 18. The three interior portions arc coaxial and each portion preferably has a constant interior diameter. A first shoulder 32 is formed between the interface of the second portion 19 and the first portion 16 in which the first end of spring 20 is seated. The spring 20 is disposed between the housing shoulder 32 and the inner member 38 of the secondary nut 18.

The secondary nut 18 thus comprises an outer member 36 and an inner member 38, forming a shoulder 37 therebetween. As previously discussed, the secondary nut 18 has an internally threaded hole 28 corresponding to the threads 24 of a leadscrew 12. The secondary nut 18 is adapted for insertion into the housing 22, with the outer member 36 being positionable within the third portion 21 of the housing, and the inner member 38 being positionable in either the third portion 21 or the second portion 19, depending upon the desired preload of the spring 20. The outer member 36 has a scalloped edge or grooves 40 on the outer periphery. Alternatively, the scalloped edge or grooves 40 may comprise other shapes such as a triangle, star, hexagon, pentagon, or any other multi-faceted configuration. For example, see the edge 40 shown in FIG. 5. The scalloped edge 40 is adapted to be inserted into complementary mating surfaces or female internal grooves 42 located on the interior surface of the third portion 21, which mate with the scalloped edge 40. The inner member 38 of the secondary nut 18 has a smaller diameter than the diameter of the second portion 19 of the housing 22, and may be inserted into the second portion 19 until the outer member 36 engages the shoulder 34 formed between the interface of the second portion 19 and the third portion 21. The shoulder 34 may thus serve as a mechanical stop to prevent further compression of the spring 20 by the secondary nut 18.

The spring 20, when mounted in this manner, applies a biasing force in opposite longitudinal directions along the axis 23 of the leadscrew 12 and thus urges the primary 16 and secondary 18 nuts in opposite directions, thereby inhibiting backlash. Minimization of backlash is important in close tolerance positioning applications. The amount of force applied to each of the primary and secondary nuts 16, 18 by the compressed spring 20 to minimize backlash depends on the preloaded compression of the spring 20. Variance in the compression of the spring 20 is accomplished by unscrewing the secondary nut 18 completely from the leadscrew 12, rotating the secondary nut 18 clockwise to increase the preload while maintaining contact with the spring 20, and then threading the secondary nut 18 onto the leadscrew 12 when the desired preload is set. The scalloped edges 40 of the secondary nut 18 allow for very fine adjustment of the preload of the spring. Thus, rotating the secondary nut 18 while in contact with the spring 20 increases or decreases the length of the spring, and hence the distance between the primary nut 16 and secondary nut 18. For coarser adjustment of the spring 20 preload, the secondary nut 18 may be slid inward or outward in the grooves 42 of the third portion 21 of the housing 22 for the desired amount of spring preload when the secondary nut 18 is unscrewed from the leadscrew 12.

The preloaded value of spring 20 is thus finely adjustable between a first position wherein the shoulders 34,37 of the primary and secondary nuts abut (maximum available compressive force for a given spring) to a second position wherein the spring is almost totally relaxed (minimum compressive force). The compressive force exerted upon the primary 16 and secondary 18 nuts may also be altered by changing the size of the spring 20 to thereby change the spring constant.

A second embodiment of a leadscrew and anti-backlash nut assembly 50 as shown in FIGS. 6 through 11 may now be described. The anti-backlash nut assembly 50 comprises a nut and spring arrangement 52 for operation on a leadscrew 12. The nut and spring arrangement 52 comprises a primary nut 16 integral with a load bearing housing 22 a preload nut 60, an adjustment member 70 and a spring 20 disposed within the housing 22.

The primary nut 16 is preferably integrally molded or machined with a load bearing housing 22 which contains the preload nut 60, the adjustment member 70 and the spring 20. The exterior surface of the integral housing 22 may comprise any desirable shape such as a square, rectangle or any other desired shape for mounting any custom designed application. Alternatively, a flange or machine element may be mounted on the external thread 30 located on the exterior surface of the primary nut 16 to provide an additional mounting surface for a machine element which is desired to be moved longitudinally along the axis 23 of the leadscrew 12.

Both the primary nut 16 and the preload member 60 are provided with internally threaded inner diameters 26 and 62, respectively, which corresponds to the external thread 24 on the leadscrew 12. Rotational movement of the leadscrew 12 is translated into longitudinal movement of the nut and spring assembly 50 along a longitudinal axis 23 of the leadscrew 12.

The interior of the integral housing 22 comprises a first threaded section 63 containing an integral primary nut 16, a second section 64 for receiving the preload member 60, a third section 66 for receiving a spring 20, and a fourth section 68 for receiving the adjustment member 70. The four interior sections of the housing 22 are coaxially aligned about axis 23 and each section except the second section 64, preferably has a constant interior diameter.

The cross-sectional shape 67 of the preload member 60 and the female mating second section 64 of housing 22 may comprise any shape such as a triangle, rectangle, or any other shape which prevents rotation of the preload member 60 with respect to the housing 24 while being threaded upon the leadscrew 12 and during operation. Preload member 60 preferably has a square cross-sectional shape 67 with rounded corners which is inserted into the mating second section 64 of housing 22. The outer lip 72 of the preload member 60 bears against shoulder 74 formed between the interface of sections 64 and 66, when the spring 20 is compressed or preloaded at the upper limit of the preload. A gap 76 exists between the preload member 60 and the primary nut 16 during operation of the assembly, such that the each member independently rotates about the leadscrew 12. As the compression of the spring 20 is reduced, preload member 60 is free to axially move within the second section 64, thereby increasing the gap 76.

The spring 20 is disposed in the third section 66 of the housing 22 between the preload member 60 and the shoulder 78 of the adjustment member 70. The maximum available amount of spring 20 preload is determined by the axial length of the spring 20 and the spring constant of the spring 20. Adjustment member 70 may be adjusted to compress the spring 20 while installed upon the leadscrew 12 until the shoulder 78 contacts the stop 82 formed at the intersection of section three 66 and section four 68. This unique adjustment feature may occur because the adjustment member 70 is not threaded upon the leadscrew 12, and instead, has a smooth inner diameter surface 83 larger than the diameter of the leadscrew 12. Adjustment member 70 is thus mounted to the interior housing 22 by an external thread 80 which mates with the interior threaded surface of section four 68. The external face 84 of the adjustment member 70 contains one or more holes 86 for the insertion of a spanner wrench or even the end of a paper clip, to aid in the adjustment of the spring 20 preload, as described further, below.

The spring 20, when mounted in this manner, applies a biasing, force in opposite longitudinal directions along the axis 23 of the leadscrew 12 and thus urges the primary nut 16 and adjustment member 70 in opposite directions. The adjustment member 70 transmits the spring force to the housing 22, resulting in the primary nut 16 being urged towards the adjustment member 70 to thereby inhibiting backlash. Thus while prior art anti-backlash assemblies generally eliminate backlash by urging the primary nut 16 and preload member 60 away from each other using a spring, backlash may also be eliminated by forcing the primary nut and preload member towards each other. The unique design of the invention enables backlash to be essentially eliminated while allowing for preload adjustment while the assembly is mounted upon the leadscrew 12. This is a unique feature not found in the prior art.

The amount of force applied to the primary nut 16 and preload member 60 by the compressed spring 20 to minimize backlash depends on the preloaded compression of the spring 20. Variance in the compression of the spring 20 is easily accomplished while the assembly 52 is installed upon the leadscrew 12, with the utilization of a spanner wrench, snap ring pliers, or even a paper clip end. In order to adjust the preload, a spanner wrench may be inserted into one of the holes 86 located on the face 84 of the adjustment member 70. While the housing 92 is held stationary upon the linearscrew 12, the wrench or paper clip is inserted into holes 86 and is used to manually rotate the adjustment member 70 clockwise to decrease the preload and counterclockwise to increase the spring preload. (These directional references refer to a right-handed linear screw, and would be opposite for a left-handed screw.) The preload value of spring 20 is thus finely adjustable between a first position wherein the shoulder 78 of the adjustment member 70 intersects the stop 82 of the housing 22 (maximum available compressive force for a given spring) to a second position wherein the spring is almost totally relaxed (minimum compressive force). The compressive force exerted by the spring 20 may be altered by changing the size of the spring to thereby change the spring constant.

Thus, this embodiment of the invention permits adjustability of the compression of an internally contained spring of a anti-backlash nut and spring assembly while the assembly is installed on the leadscrew. In addition, because of the unique design of the housing 22, the problem of an undesired change in spring preload during load reversal is essentially eliminated. Accordingly, the preferred embodiment of a anti-backlash nut and leadscrew assembly has been described. With the foregoing description in mind, however, it is understood that this description is made only by way of example, that the invention is not limited to the particular embodiments described herein, and that various rearrangements, modifications and substitutions may be implemented without departing from the true spirit of the invention as hereinafter claimed.

What is claimed is:

1. An adjustable anti-backlash nut and leadscrew assembly, comprising:

a housing comprising a primary nut connected thereto, said primary nut having an internal thread which mates with an external thread on the leadscrew.

a preload member disposed within said housing, said preload member having an internal thread which mates with the external thread on the leadscrew, said preload member having means for preventing relative rotational movement between said preload member and said housing;

said primary nut being capable of rotational movement about the leadscrew independent of said preload member;

an adjustment member threadedly connected to said housing and having a hole for insertion of the leadscrew therethrough whereby the adjustment member may be rotated about the leadscrew during operation for adjusting the preload;

a spring contained within said housing and disposed between said preload member and said adjustment member for urging said primary nut and preload member towards each other; and said housing imparting rotational movement applied thereto simultaneously to said primary nut and said preload member.

2. The nut assembly of claim 1, wherein said primary nut is integrally connected to said housing.

3. The nut assembly of claim 1, wherein said preload member comprises one or more grooves, and an interior surface of said housing is provided with a complementary mating surface for preventing rotational movement of the preload member with respect to the housing.

4. The nut assembly of claim 1, wherein said adjustment member comprises axial holes for insertion of means for preventing rotation of said adjustment member while said housing is rotated.

5. The nut assembly of claim 1, wherein a gap is provided between said primary nut and said preload member.

6. The nut assembly of claim 1, wherein said periphery of said preload member has one or more grooves, and said interior surface of said housing is provided with complementary-mating surface.

7. The nut assembly of claim 1, wherein said primary nut and said secondary nut are comprised of metal.

8. The nut assembly of claim 1, wherein the interior surface of said housing comprises a means for adjusting the compression of said spring.

9. The nut assembly of claim 1, wherein said housing comprises external threads for the mounting of a flange.

10. The nut assembly of claim 1, wherein said periphery of said preload member is square shaped, and said interior surface of said housing is provided with a complementary-mating surface.

11. An anti-backlash nut assembly for translational movement along the axis of a leadscrew in response to rotational movement of the nut assembly relative to the leadscrew, comprising:

a housing comprising a primary nut therein, said primary nut having an internal thread which mates with an external thread on the leadscrew;

a secondary nut disposed within said housing, said secondary nut having an internal thread which mates with the external thread on the leadscrew, said primary nut being capable of rotational movement about the leadscrew independent of said secondary nut;

a spring contained within said housing for preventing backlash of said primary and secondary nut upon said leadscrew; and said housing imparting rotational movement applied thereto simultaneously to said primary nut and said secondary nut.

12. The assembly of claim 11 wherein said primary nut is integrally connected with said housing.

13. The assembly of claim 11 wherein said spring is disposed between said primary and secondary nut.

14. The assembly of claim 11 further comprising:

an adjustment member threadedly connected to said housing and having a hole for insertion of said lead screw;

said spring being disposed between said primary nut and said adjustment member whereby said spring urges said primary nut towards said secondary nut; and an adjustment member being capable of adjusting the spring preload during operation of the assembly.

15. The assembly of claim 14 wherein a spatial gap is formed between a housing shoulder and said secondary member.

* * * * *